(12) United States Patent
Yokomizo

(10) Patent No.: US 9,412,033 B2
(45) Date of Patent: Aug. 9, 2016

(54) IMAGE PROCESSING APPARATUS CAPABLE OF PREVENTING PAGE MISSING, CONTROL METHOD THEREFOR, AND STORAGE MEDIUM

(71) Applicant: CANON KABUSHIKI KAISHA, Tokyo (JP)

(72) Inventor: Tsuyoshi Yokomizo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 84 days.

(21) Appl. No.: 13/858,140

(22) Filed: Apr. 8, 2013

(65) Prior Publication Data
US 2013/0272608 A1    Oct. 17, 2013

(30) Foreign Application Priority Data

Apr. 12, 2012    (JP) ................................. 2012-090945

(51) Int. Cl.
*G06K 9/34* (2006.01)
*G06K 9/00* (2006.01)
*H04N 1/411* (2006.01)

(52) U.S. Cl.
CPC .............. *G06K 9/34* (2013.01); *G06K 9/00442* (2013.01); *H04N 1/4115* (2013.01)

(58) Field of Classification Search
None
See application file for complete search history.

(56) References Cited

U.S. PATENT DOCUMENTS

| 6,632,035 | B1* | 10/2003 | Kawamoto ...................... 400/61 |
| 6,789,482 | B2* | 9/2004 | Yokoyama ............. B42D 15/00 101/483 |
| 6,799,178 | B2* | 9/2004 | Iwase et al. |
| 8,050,499 | B2* | 11/2011 | Kanatsu ........................ 382/173 |
| 8,442,312 | B2 | 5/2013 | Moroo et al. |
| 8,654,411 | B2 | 2/2014 | Oshima |
| 2002/0044299 | A1* | 4/2002 | Iwase et al. .................. 358/1.15 |
| 2002/0045422 | A1* | 4/2002 | Iwase et al. ........................ 455/1 |
| 2004/0112236 | A1* | 6/2004 | Yokoyama ............. B42D 15/00 101/483 |
| 2006/0023236 | A1* | 2/2006 | Sievert et al. ................. 358/1.12 |
| 2006/0050669 | A1* | 3/2006 | Kaikuranta et al. .......... 370/338 |
| 2006/0061793 | A1* | 3/2006 | Nishikawa et al. ........... 358/1.13 |
| 2010/0231981 | A1* | 9/2010 | Silverbrook et al. ........ 358/3.28 |
| 2011/0211212 | A1* | 9/2011 | Berard ............... H04N 1/00204 358/1.13 |

FOREIGN PATENT DOCUMENTS

| JP | 01-129358 A | 5/1989 |
| JP | 2002112006 A | 4/2002 |
| JP | 2004-265384 A | 9/2004 |
| JP | 2006339962 A | 12/2006 |
| JP | 2009152956 A | 7/2009 |
| JP | 2011061310 A | 3/2011 |

OTHER PUBLICATIONS

Office Action issued in Japanese Appln. No. 2012090945 mailed Mar. 22, 2016.

* cited by examiner

*Primary Examiner* — Feng Niu
(74) *Attorney, Agent, or Firm* — Rossi, Kimms & McDowell LLP

(57) ABSTRACT

An image processing which is capable of preventing page missing even when there is an image having no foreground image. In a case where a foreground image is extracted from an obtained image, the foreground image is generated as an image for one page, and in a case where no foreground image is extracted from the obtained image, an image indicating that no foreground image is extracted is generated as an image for one page.

6 Claims, 4 Drawing Sheets

IMAGE PROCESSING APPARATUS CAPABLE OF PREVENTING PAGE MISSING, CONTROL METHOD THEREFOR, AND STORAGE MEDIUM

BACKGROUND OF THE INVENTION

1. Field of the Invention

The present invention relates to an image processing apparatus, a control method therefor, and a computer-readable storage medium storing a program for implementing the method.

2. Description of the Related Art

In recent years, when documents are created, advanced functions of, for example, not only entering characters but also decorating fonts, freely creating drawings, or capturing photographs have been used.

As objects to be created become more advanced, the amount of effort required for creating an entirely new document increases. Thus, it is desired that part of documents created in the past are rendered reusable as it is or after being processed and edited as much as possible.

Also, there have been increasing occasions where documents are electronically distributed due to proliferation of networks typified by the Internet, but in many cases, electronic documents are distributed as sheet documents printed on sheets.

There have been developed techniques to, even when there is only a sheet document at hand, obtain contents of the sheet document as reusable data.

As for sheet document data, for example, a technique that when a sheet document is electronically scanned in, a document that matches contents of the sheet document is retrieved from a database so that the document can be used in place of the scanned-in sheet document (see, for example, Japanese Laid-Open Patent Publication (Kokai) No. 2004-265384).

On the other hand, when no document matching the contents of the sheet document can be retrieved from the database, the contents of the sheet document are converted into easily-reusable electronic data, and hence in this case as well, the contents of the sheet document can be reused.

Examples of such techniques to convert character information in a document image into easily-reusable electronic data include an OCR technique. Also, examples of techniques to convert graphic information comprised of lines and planes into easily-reusable data include a vectorization technique.

Japanese Laid-Open Patent Publication (Kokai) No. 2004-265384 discloses a technique to convert characters in a document image into reusable data by converting them into character codes or vectorizing outlines of graphics using any of the above techniques.

Further, Japanese Laid-Open Patent Publication (Kokai) No. 2004-265384 discloses a technique to construct data that identifies areas such as characters, line drawings, natural images, and tables in a document image and expresses the relationship among the areas in the form of a tree structure.

This technique arranges the character codes, vector data, image data, and so on according to the tree structure to enable conversion into electronic document pages that can be edited using applications.

Data thus obtained has a layout similar to that of the original document, and as with electronic document pages newly created using a document creating application or the like, the data can easily be subjected to changing of positions and sizes of characters and graphics as well as geometric deformation, coloring, and so on.

Also, there have been techniques to recognize structures of tabular areas in document images. For example, there has been disclosed a technique to obtain a matrix structure comprised of rectangular frame areas in a table (see, for example, Japanese Laid-Open Patent Publication (Kokai) No. H01-129358).

By combining a matrix structure of frame areas obtained using this technique and OCR results of in-frame characters obtained using the above technique, a table area in a document image into electronic data having a table structure.

According to the conventional techniques described above, an original image can be divided into foreground images, which represent vector data or cut-out images (areas (objects) such as characters, line drawings, natural images, and tables) and a background image.

The background image is generated by deleting, from the original image, pixel information in areas where the foreground images are present.

FIGS. 6A and 6B are views useful in explaining a background image, in which FIG. 6A shows an original image, and FIG. 6B shows a background image.

Line drawing portion pixels of line drawing portions in FIG. 6A, that is, character pixel clusters 601 to 603, a line drawing pixel cluster 608, and a table frame cluster 604 are filled with a surrounding pixel color in the background image of FIG. 6B.

As for a natural image area 609, the entire rectangular area thereof is filled with a surrounding pixel color.

In relation to such a background image, there is known a function of generating data without adding a background image so as to increase reusability for a user.

When this function is enabled, no data is generated for a page whose image includes no foreground image such as character data, and hence the page (image) itself is not output.

Therefore, the problem that the page count of originals and the page count of generated data are different will arise. When the page counts are different, and further, the number of originals is large, it is difficult to know which page is missing.

Moreover, when a person who holds originals and a person who receives a document in data format are different, the person who receives the document does not know that there is a page missing.

SUMMARY OF THE INVENTION

The present invention provides an image processing apparatus and a control method therefor which prevent page missing even when there is an image having no foreground image, as well as a computer-readable storage medium storing a program for implementing the method.

Accordingly, a first aspect of the present invention provides an image processing apparatus comprising an extraction unit configured to extract a foreground image from an obtained image, and a generation unit configured to, in a case where the foreground image is extracted by the extraction unit, generate the foreground image as an image for one page, and in a case where the foreground image is not extracted by the extraction unit, generate, as an image for one page, an image indicating that the foreground image is not extracted.

Accordingly, a second aspect of the present invention provides a control method implemented by an image processing apparatus, comprising an extraction step of extracting a foreground image from an obtained image, and a generation step of, in a case where the foreground image is extracted in the extraction step, generating the foreground image as an image for one page, and in a case where the foreground image is not extracted in the extraction step, generating, as an image for one page, an image indicating that the foreground image is not extracted.

Accordingly, a third aspect of the present invention provides a non-transitory computer-readable storage medium storing a program for causing a computer, which an image processing apparatus has, to implement a control method implemented in the image processing apparatus, the control method comprising an extraction step of extracting a foreground image from an obtained image, and a generation step of, in a case where the foreground image is extracted in the extraction step, generating the foreground image as an image for one page, and in a case where the foreground image is not extracted in the extraction step, generating, as an image for one page, an image indicating that the foreground image is not extracted.

Accordingly, a fourth aspect of the present invention provides an image processing apparatus comprising an extraction unit configured to extract a character from an image, and a generation unit configured to, in a case where the character is extracted by the extraction unit, generate a page image with the character, and in a case where the character is not extracted by the extraction unit, generate a blank image.

According to the present invention, even when where is an image having no foreground image, page missing can be prevented.

Further features of the present invention will become apparent from the following description of exemplary embodiments (with reference to the attached drawings).

BRIEF DESCRIPTION OF THE DRAWINGS

FIGS. 6A and 6B are views useful in explaining a background image, in which FIG. 6A shows an original image, and FIG. 6B shows a background image.

DESCRIPTION OF THE EMBODIMENTS

The present invention will now be described in detail with reference to the drawings showing an embodiment thereof. In the present embodiment described hereafter, an image processing apparatus according to the present invention is applied to an MFP (multi function peripheral).

Figure 1:
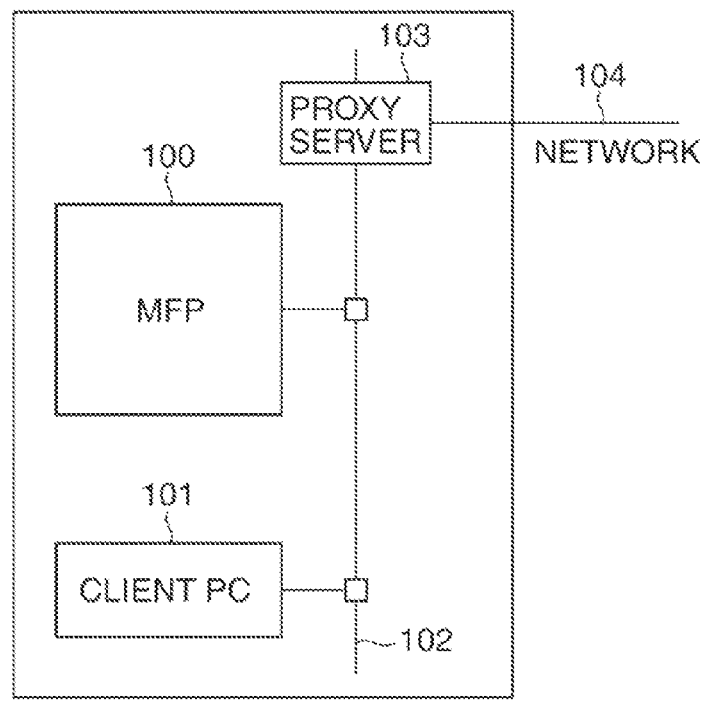
FIG. 1 is a diagram showing an exemplary image processing system including an MFP according to an embodiment of the present invention.

FIG. 1 is a diagram showing an exemplary image processing system including an MFP 100 according to the embodiment of the present invention.

Referring to FIG. 1, the image processing system 1 is comprised of the MFP 100, a proxy server 103, and a client PC 101, which are connected together via a LAN 102.

The MFP 100 is a multi function peripheral that realizes multiple kinds of functions (for example, a copying function, a printing function, and a sending function) related to image processing.

For example, by sending print data to the MFP 100, the client PC 101 can produce a printout based on the print data using the MFP 100.

The LAN 102 is connected to a network 104, which enables communications with external apparatuses, via the proxy server 103.

This network 104 has only to be able to send and receive data. Concrete examples of the network 104 include the Internet, a LAN, a WAN, a telephone line, a dedicated digital circuit, an ATM, a frame relay circuit, a communication satellite circuit, a cable television circuit, or a data broadcasting wireless circuit, or combinations of them.

Terminals such as the client PC 101 and the proxy server 103 each have standard component elements incorporated into a general-purpose computer. Concrete examples of the component elements include a CPU, a RAM, a ROM, a hard disk, an external storage device, a network interface, a display, a keyboard, and a mouse.

Figure 2:
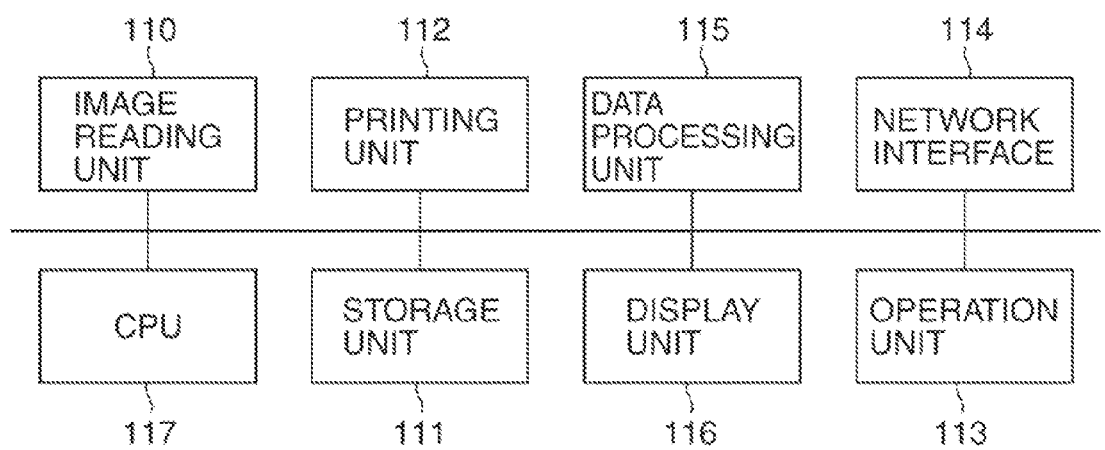
FIG. 2 is a diagram schematically showing an arrangement of the MFP appearing in FIG. 1.

FIG. 2 is a diagram schematically showing an arrangement of the MFP 100 appearing in FIG. 1.

Referring to FIG. 2, the MFP 100 is comprised of a CPU 117, a storage unit 111, a display unit 116, an operation unit 113, an image reading unit 110, a printing unit 112, a data processing unit 115, and a network interface 114.

The CPU 117 controls the overall operation of the MFP 100. The storage unit 111 is comprised of a ROM, a RAM, an HDD, and so on. Programs such as a boot program are stored in the ROM. Images and programs are expanded on the RAM, and the RAM is used as a work area. Programs, images, databases, and so on are stored in the HDD.

The display unit 116 displays information for a user such as conditions of operation inputs and images being processed. The operation unit 113 is comprised of keys, buttons, and so on which are to be operated by the user. When the display unit 116 is equipped with a touch panel, this touch panel also constitutes the operation unit 113.

The data processing unit 115 performs data processing such as signal processing. The network interface 114 is for connecting with the LAN 102.

The image reading unit 110, which includes an auto document feeder (ADF), irradiates an original with a light source and forms an original reflected image on a solid-state image pickup device through a lens. The image reading unit 110 then obtains a raster-like image reading signal as an image of a predetermined density (for example, 600 dpi) from the solid-state image pickup device.

The printing unit 112 prints an image on a recording medium. The printing unit 112 prints, for example, an image corresponding to the image reading signal mentioned above on a recording medium. When one original image is to be copied, an image reading signal obtained from the image reading unit 110 is subjected to image processing by the data processing unit 115 to produce a recording signal, which in turn is printed on a recording medium by the printing unit 112.

On the other hand, when a plurality of original images are to be copied, a process in which a recording signal for one page is temporarily stored in the storage unit 111 and then output to the printing unit 112 is successively repeated to print images on recording media.

Moreover, to perform printing of print data output from the client PC 101 and received by the network interface 114, the printing unit 112 prints an image on a recording medium using raster data processed by the data processing unit 115.

Further, the MFP 100 has a function of sending an image via the network interface 114.

At the time of sending, the MFP 100 converts an image, which is obtained by the image reading unit 110, into an image file in a compressed image file format such as TIFF or JPEG or in a vector data file format such as PDF and outputs the image from the network interface 114.

The output image is sent to the client PC 101 via the LAN 102 or further transferred to an external terminal (for example, another MFP or client PC) via the network 104.

In the above description, the present embodiment is applied to the MFP 100 for example, but the present embodiment may be applied to a scanner apparatus capable of scanning in originals.

Figure 3:
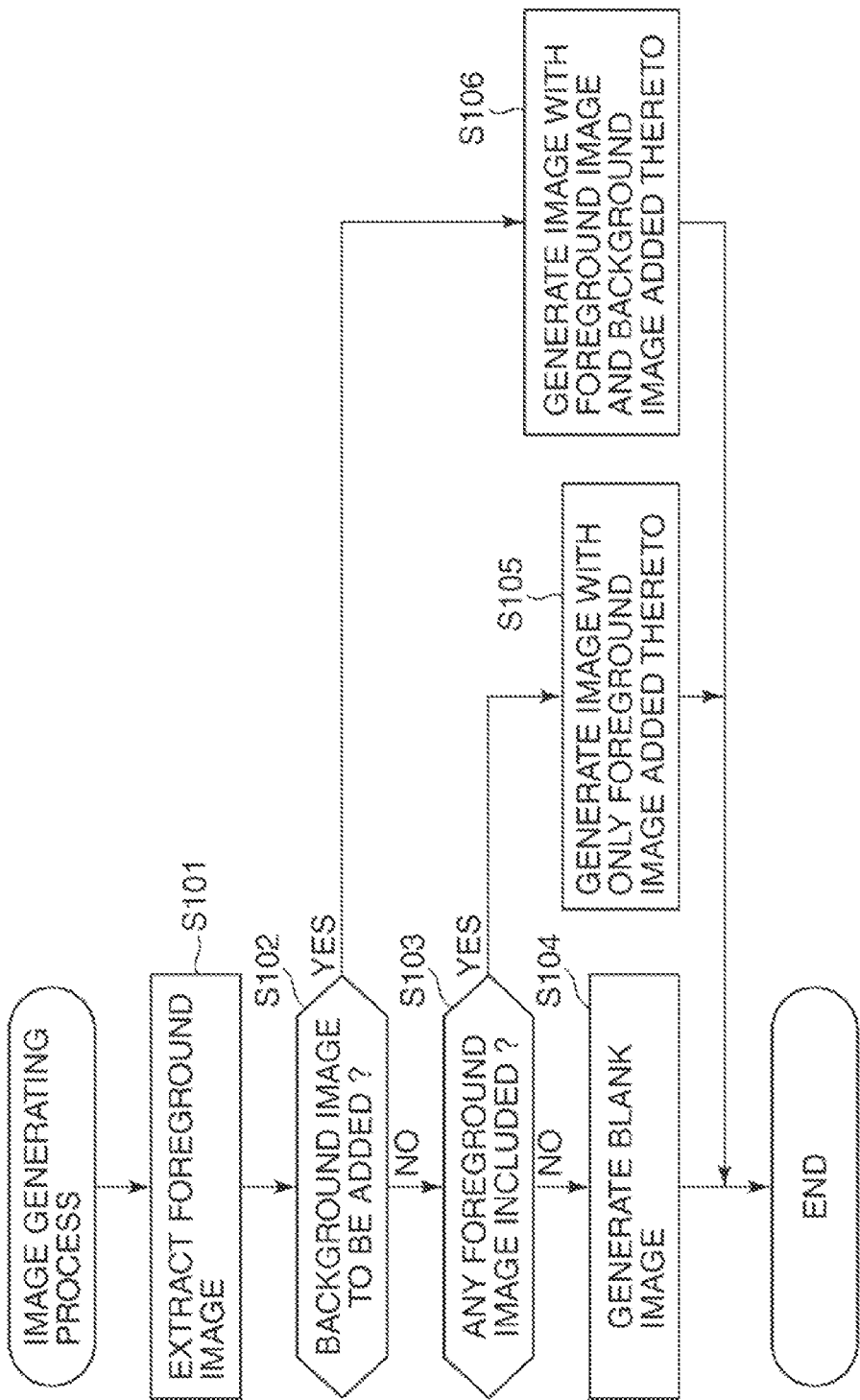
FIG. 3 is a flowchart showing the procedure of an image generating process carried out by a CPU appearing in FIG. 2.

FIG. 3 is a flowchart showing the procedure of an image generating process carried out by the CPU 117 appearing in FIG. 2. It should be noted that the CPU 117 carries out the process in the flowchart of FIG. 3 by reading out and executing programs stored in the storage unit 111.

Figure 6A:
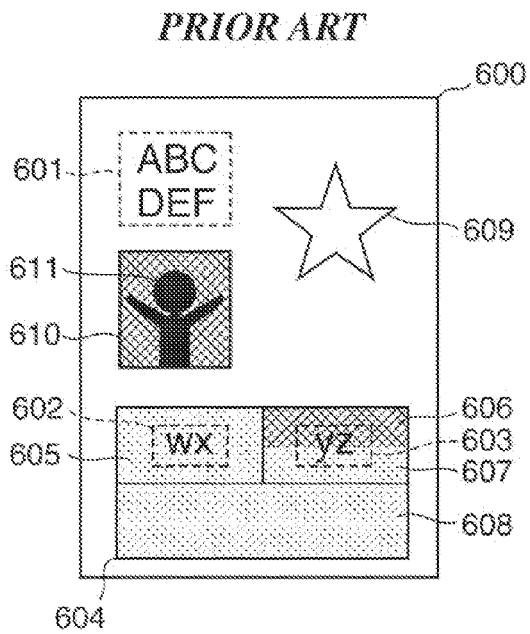
Figure 6B:
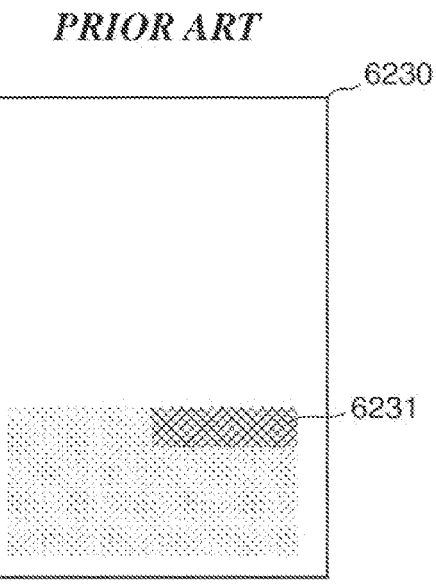

Referring to FIG. 3, the CPU 117 obtains an image on one page by causing the image reading unit 110 to read one side of an original. Then, the CPU 117 causes the data processing unit 115 to extract foreground images from the obtained image (step S101). For example, referring to FIGS. 6A and 6B, foreground images shown in FIG. 6A are extracted. It should be noted that the obtained original image can be divided into foreground images and a background image. The foreground image is vector data and cut-out images (areas (objects) such as characters, line drawings, natural images, and tables). The background image is generated by deleting, from the original image, pixel information in areas where the foreground images are present. FIG. 6A shows the original image, and FIG. 6B shows the background image after the foreground images are extracted from the original image.

The CPU 117 then determines whether or not to add a background image to an image to be generated (step S102). Here, for example, the user configures a setting as to whether or not to add a background image to an image to be generated, and according to this setting, the CPU 117 determines whether or not to add a background image to an image to be generated.

When, as a result of the determination in the step S102, a background image is to be added (YES in the step S102), the CPU 117 generates an image with a foreground image and a background image added thereto (step S106) and terminates the present process.

On the other hand, when as a result of the determination in the step S102, a background image is not to be added (NO in the step S102), the CPU 117 determines whether or not there is an extracted foreground image (step S103).

When, as a result of the determination in the step S103, when there is an extracted foreground image (YES in the step S103), the CPU 117 generates an image consisting only of a foreground image (step S105) and terminates the present process.

On the other hand, when, as a result of the determination in the step S103, there is no extracted foreground image (NO in the step S103), the CPU 117 generates a blank image (an image indicating that no foreground image has been extracted) (step S104) and terminates the present process.

It should be noted that the images generated in the steps S104, S105, and S106 are each generated as a page image for one page. When a plurality of images are obtained as in a case where there are a plurality of originals and a case where both sides of an original are read, the CPU 117 repeatedly carries out the process a plurality of times corresponding to the number of reading surfaces of originals, thus generating images including foregrounds or blank images corresponding to the respective images. Here, the CPU 117 generates a piece of document data (image data) in which images including foregrounds or blank images corresponding to the respective images are arranged in an order predetermined in advance. It should be noted that the document data may be formatted by the CPU 117 as an image file in a compressed image file format such as TIFF or JPEG or in a vector data file format such as PDF.

The predetermined order should be an order in which obtained images have been obtained. This order corresponds to an order of pages in the document data.

The order in which the above obtained images have been obtained is given as an example because, for example, a plurality of originals are read and thus images are obtained in the order in which the originals are read.

The process in the flowchart of FIG. 3 may be carried out in a case where an instruction to carry out an image generating process (foreground extracting process) is received from the operation unit 113 with respect to images read by the image reading unit 110 and stored in the storage unit 111 of the MFP 100. On this occasion, the above described order determined in advance should be an order in which images including foregrounds and images indicating that no foreground images have been extracted are generated by the generating unit. For example, when document data on a plurality of pages are stored in the storage unit 111, and there is an instruction to carry out an image generating process (foreground extracting process) with respect to the document data, the CPU 117 carries out the process in the flowchart of FIG. 3 on the document data. At this time, the image generating process is carried out in a page order of the original document data, and hence a page order of document data to be newly generated should be an order in which images including foregrounds and images indicating that no foreground images have been extracted are generated by the generating unit.

The image generating process in FIG. 3 is carried out whenever an image is obtained by the image reading unit 110, or for each page included in the original document data stored in the storage unit 111. Thus, when no foreground image is extracted, a blank image is generated to prevent page missing.

Specifically, in the step S104, when no foreground image has been extracted, and a background image of an obtained image is not to be added to an image to be generated, a blank image indicating that no foreground image has been extracted is generated, and hence page missing can be prevented. Also, in the steps S105 and S106, when a foreground image has been extracted, an image including a foreground image is generated. An image including a foreground image is an image to which only a foreground image is added or an image to which a foreground image and a background image are added. Thus, a blank image is generated even when there is an image including no foreground image, and therefore, page missing does not occur even when there is an image including no foreground image.

Figure 4:
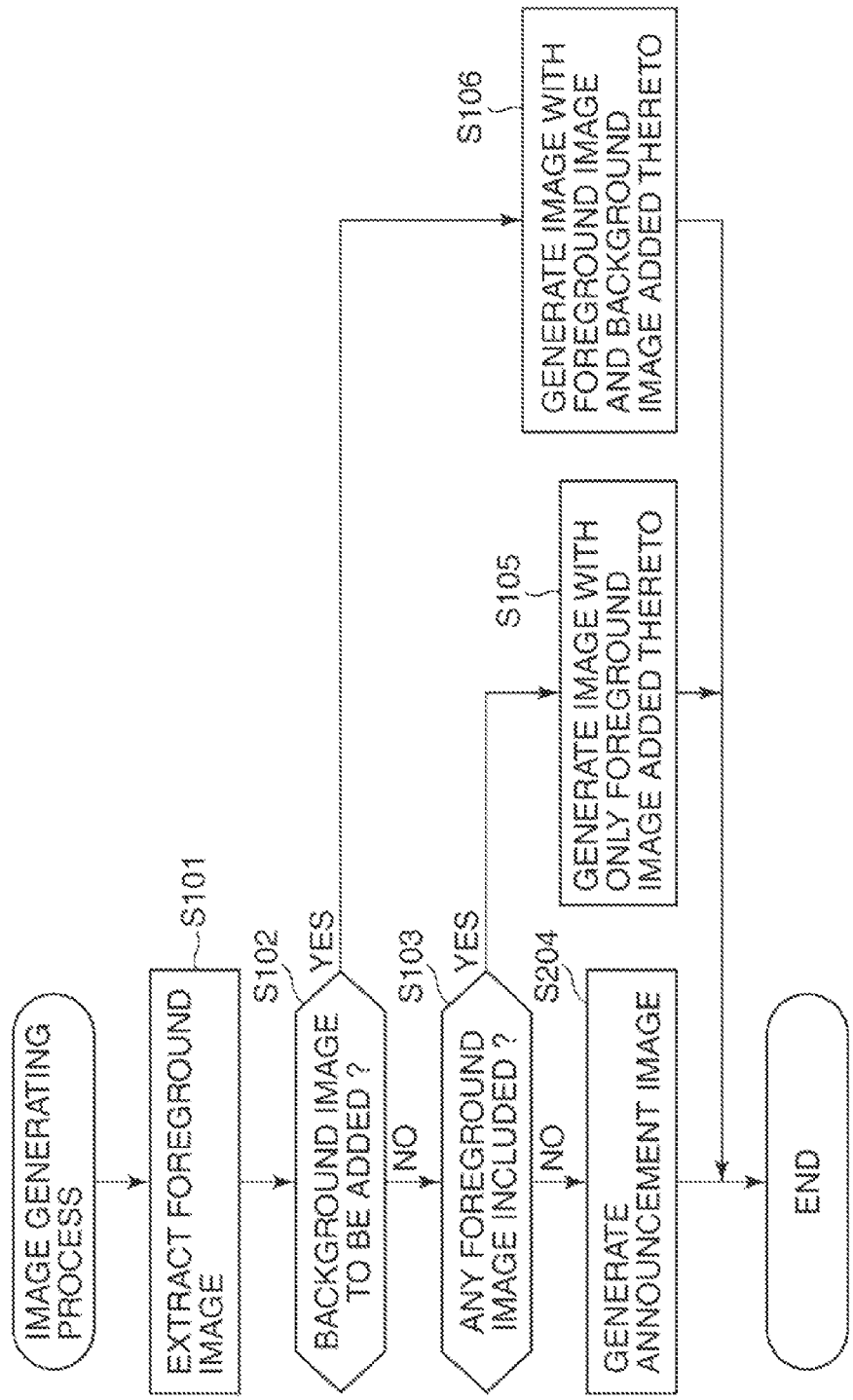
FIG. 4 is a flowchart showing the procedure of a variation of the image generating process carried out by the CPU appearing in FIG. 2.

FIG. 4 is a flowchart showing the procedure of a variation of the image generating process carried out by the CPU 117 appearing in FIG. 2.

In FIG. 4, steps in which the same processes as in the steps in FIG. 3 are designated by the same numbers, and hence a point of difference from FIG. 3 is step S204.

Thus, when, as a result of the determination in the step S103, there is no extracted foreground image (NO in the step S103), the CPU 117 generates an announcement image as an image indicating that a foreground image could not be extracted (step S204) and terminates the present process.

Figure 5:
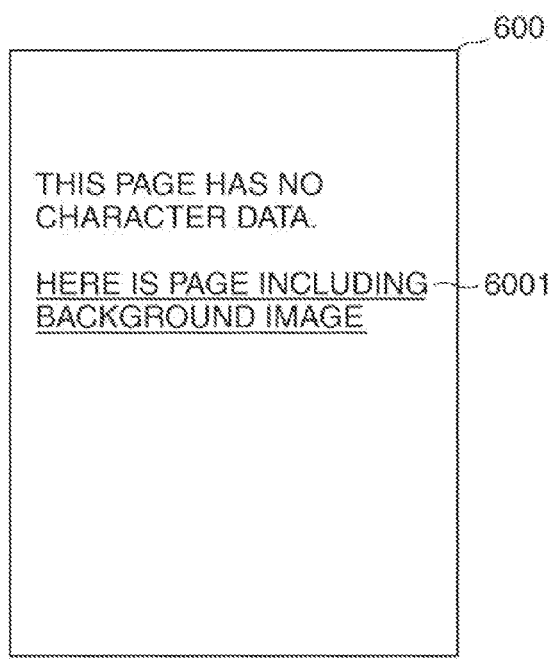
FIG. 5 is a view showing an announcement image appearing in FIG. 4.

FIG. 5 is a view showing the announcement image 600 appearing in FIG. 4.

Referring to FIG. 5, a message saying that "this page has no character data" is shown in the announcement image 600 to announce that no foreground image has been extracted from a corresponding page of original image data. As a result, it can be distinguished whether the original image was a blank image or an image consisting of only a background image.

Further, the CPU 117 may generate the announcement image 600 including a link 6001. The CPU 117 adds, to a last page or later of an image to be generated, a page (reference image) from which a foreground image has been extracted and removed and thus has only a background image and which can be refereed to only when the link 6001 is designated. As a result, when the link 6001 is designated, the page having only the background image is displayed.

In the process in FIG. 4, when no foreground image has been extracted, and a background image of an obtained image is not to be added to an image to be generated, a reference image including the background image of the obtained image from which no foreground mage has been extracted is generated in addition to an announcement image, and a link to the reference image is included in the announcement image.

It should be noted that the images generated in the steps S204, S105, and S106 are each generated as a page image for one page. In the process in the flowchart of FIG. 4 as well, when a plurality of images are to be obtained as in a case where there are a plurality of originals or a case where both sides of an original are read, the CPU 117 repeatedly carries out the above process a plurality of times corresponding to the number of originals reading surfaces. The CPU 117 then generates images including foregrounds or blank images corresponding to the respective images. Here, the CPU 117 generates a piece of document data in which images including foregrounds or blank images corresponding to the respective images are arranged in the above described order predetermined in advance. It should be noted that the document data may be formatted as an image file in a compressed image file format such as TIFF or JPEG or in a vector data file format such as PDF by the CPU 117.

Document data generated using the method according to the embodiment described above is stored in the storage unit 111 by the CPU 117. The document data may be printed or sent to an external apparatus via the network 104 in accordance with an instruction received from the operation unit 113 or the external client PC 101. It should be noted that when the generated document data is to be printed, the CPU 117 may provide control to print an image other than a reference image included in the generated image data without printing the reference image or to print the reference image as well. Also, from the operation unit 113 or the external client PC 101, the user may configure a setting as to whether or not to print the reference image. When the generated document data is to be sent to an external apparatus, the CPU 117 may provide control to send an image other than a reference image included in the generated image data without printing the reference image or to send the reference image as well. Also, from the operation unit 113 or the external client PC 101, the user may configure a setting as to whether or not to send the reference image.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-090945 filed Apr. 12, 2012, which is hereby incorporated by reference herein in its entirety.

What is claimed is:

1. An image processing apparatus comprising:
an input unit configured to input plural page images;
an extraction unit configured to extract a foreground image from each of the plural page images input by said input unit;
a page data generation unit configured to generate page data which includes the foreground image extracted by said extraction unit;
an announcement page data generation unit configured to generate announcement page data corresponding to a page image from which the foreground image has not been extracted by said extraction unit, the announcement page data having a link to a reference image including a background image of a page image from which the foreground image has not been extracted by said extraction unit; and
a file generation unit configured to generate a file which includes the page data generated by said page data generation unit and the announcement page data generated by said announcement page data generation unit,
wherein said input unit, said extraction unit, said page data generation unit, said announcement page data generation unit and said file generation unit are implemented at least in part by at least one processor and at least one memory.

2. The image processing apparatus according to claim 1, wherein said input unit is able to input the plural page images by reading plural originals.

3. The image processing apparatus according to claim 1, further comprising a printing unit configured to perform printing based on the file which includes the page data generated by said page data generation unit and the announcement page data generated by said announcement page data generation unit.

4. The image processing apparatus according to claim 1, further comprising a sending unit configured to send the file including the page data generated by said page data generation unit and the announcement page data generated by said announcement page data generation unit to an external apparatus.

5. A control method implemented by an image processing apparatus, comprising:
inputting plural page images;
extracting a foreground image from each of the input plural page images;
generating page data which includes the extracted foreground image;
generating announcement page data corresponding to a page image from which the foreground image has not been extracted, the announcement page data having a link to a reference image including a background image of a page image from which the foreground image has not been extracted; and generating a file which includes the generated page data and the generated announcement page data.

6. A non-transitory computer-readable storage medium storing a program for causing a computer, which an image processing apparatus has, to implement a control method implemented in the image processing apparatus, the control method comprising:

inputting plural page images;

extracting a foreground image from each of the input plural page images;

generating page data which includes the extracted foreground image;

generating announcement page data corresponding to a page image from which the foreground image has not been extracted, the announcement page data having a link to a reference image including a background image of a page image from which the foreground image has not been extracted; and generating a file which includes the generated page data and the generated announcement page data.

* * * * *